No. 845,592. PATENTED FEB. 26, 1907.
F. STEWART.
SHOVEL HANDLE.
APPLICATION FILED NOV. 3, 1906.
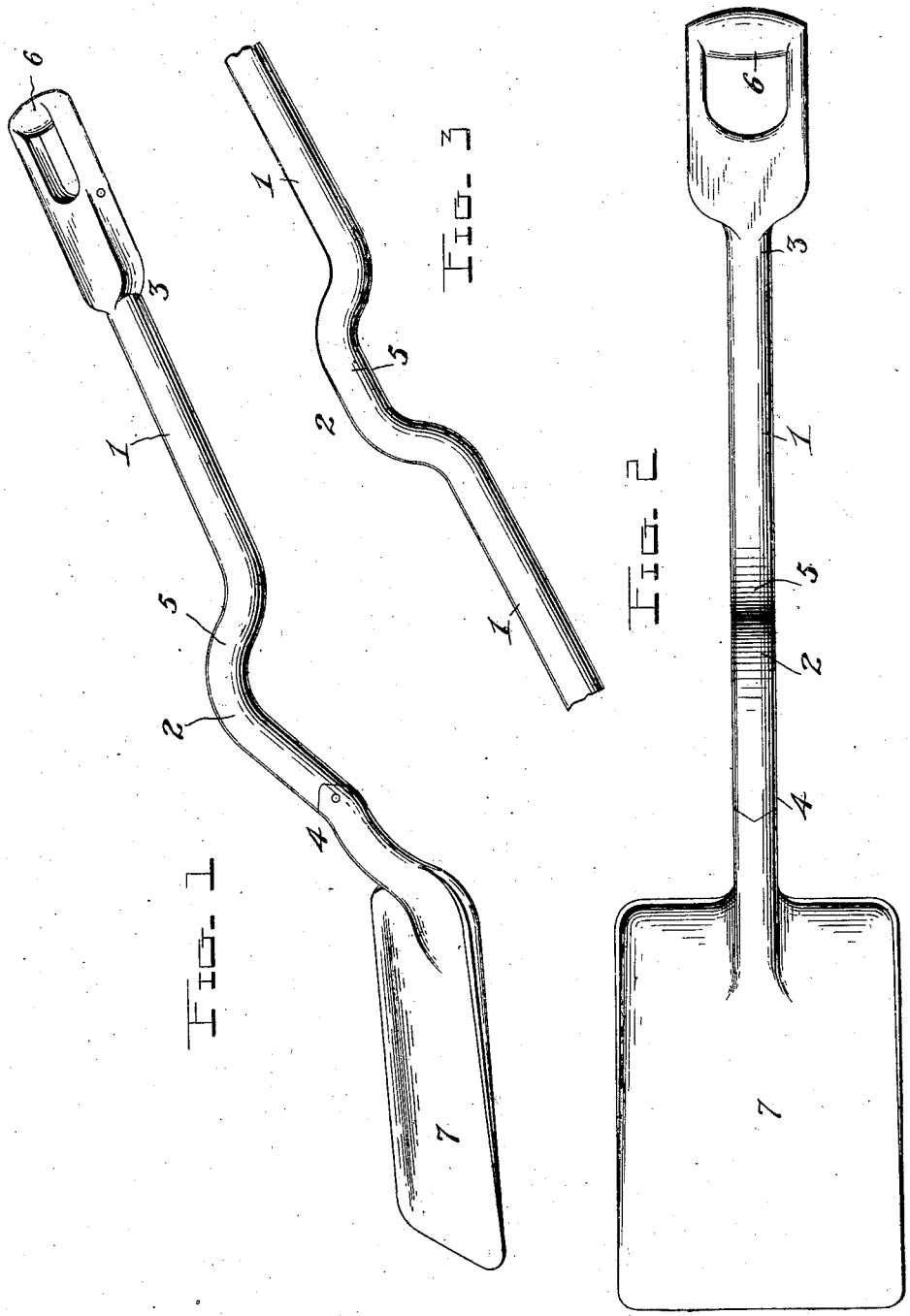
Witnesses
Inventor
Frank Stewart
by Watson E. Coleman
Attorney

UNITED STATES PATENT OFFICE.

FRANK STEWART, OF ASPEN, COLORADO.

SHOVEL-HANDLE.

No. 845,592.　　　　Specification of Letters Patent.　　　　Patented Feb. 26, 1907.

Application filed November 3, 1906. Serial No. 341,857.

*To all whom it may concern:*

Be it known that I, FRANK STEWART, a citizen of the United States, residing at Aspen, in the county of Pitkin and State of Colorado, have invented certain new and useful Improvements in Shovel-Handles, of which the following is a specification, reference being had therein to the accompanying drawing.

This invention relates to improvements in handles for shovels, pitchforks, and similar implements.

The object of the invention is to provide the handle of an implement of this character with a hand-grip or handhold at a point intermediate its ends, so that it may be more conveniently and effectually used.

With the above and other objects in view the invention consists in the novel features hereinafter more fully described and claimed, and illustrated in the accompanying drawings, in which—

Figure 1 is a perspective view of a shovel having my improved handle. Fig. 2 is a top plan view of the same, and Fig. 3 is a detail side elevation of a portion of an implement-handle having a handhold of slightly different shape from that shown in Fig. 1.

In the practice of my invention I provide the handle 1 of a shovel, spade, pitchfork, or any other similar lifting implement with a handhold 2 at a suitable point intermediate its upper end 3 and its lower end 4, on which the operative part of the implement is mounted. This handhold 2 is in the form of a vertically and laterally projecting offset, and it is preferably curved, as clearly shown in Fig. 1. It is also in the form of a crank, and its upper and shorter portion 5 is so arranged and shaped that it may be conveniently grasped by one hand of the user of the implement. The remaining portion of the handle 1 may be straight, curved, or of any other shape and may be of any length. The shovel shown in the drawings has a well-known form of hand-grip or handhold 6 at its end 3 and a well-known form of shovel-pan 7 at its lower end 4; but it will be understood that these parts may be varied as desired.

In Fig. 3 I show the improved handhold 2, of slightly-different shape, in a straight handle 1. This form of handhold is slightly less angular in shape than the one shown in Fig. 1 of the drawings; but it is also in the form of a laterally and vertically projecting offset or crank. This particular shape of handhold is especially well adapted for the long straight handles on spades, pitchforks, and the like, since it will effectively prevent turning of the handle in the user's hands, and hence lateral tipping or tilting of the implement. The provision of the handhold 2 intermediate the ends of the handle 1 obviates the necessity of the user tightly gripping the same and lessens the liability of the shovel or other implement tilting and upsetting when loaded. It enables the implement to be used with greater force and is less tiring upon the user. Owing to the peculiar shape of the handhold, the user's hand rests naturally in it and he need not stoop over to as great an extent as when the ordinary straight handle is employed.

While I have shown my invention as embodied in the handle of one form of shovel, I wish it understood that I do not limit myself to this application and that the improved handhold may be formed in a handle of any material, form, and construction upon a lifting implement of any description. It will also be obvious that the vertically and laterally projecting offset to form the handhold 2 may be curved in any degree, and for that reason I do not desire to be confined to the exact construction and arrangement shown.

Having thus described my invention, what I claim as new, and desire to secure by Letters Patent of the United States, is—

A handle for implements of the class described, comprising a straight body bent intermediate its ends to provide a transversely and vertically projecting, integral, offset handhold, the latter being in the form of a crank and lying wholly outside of the longitudinal axis of the remaining portion of the body, substantially as shown and for the purposes set forth.

In testimony whereof I hereunto affix my signature in presence of two witnesses.

FRANK STEWART.

Witnesses:
　EDITH LINDSTROM,
　JOHN M. McCRAY.